Aug. 7, 1945.　　　　D. E. WILLIS　　　　2,381,529
VEHICLE LANDING GEAR
Filed Nov. 16, 1944　　　3 Sheets-Sheet 1
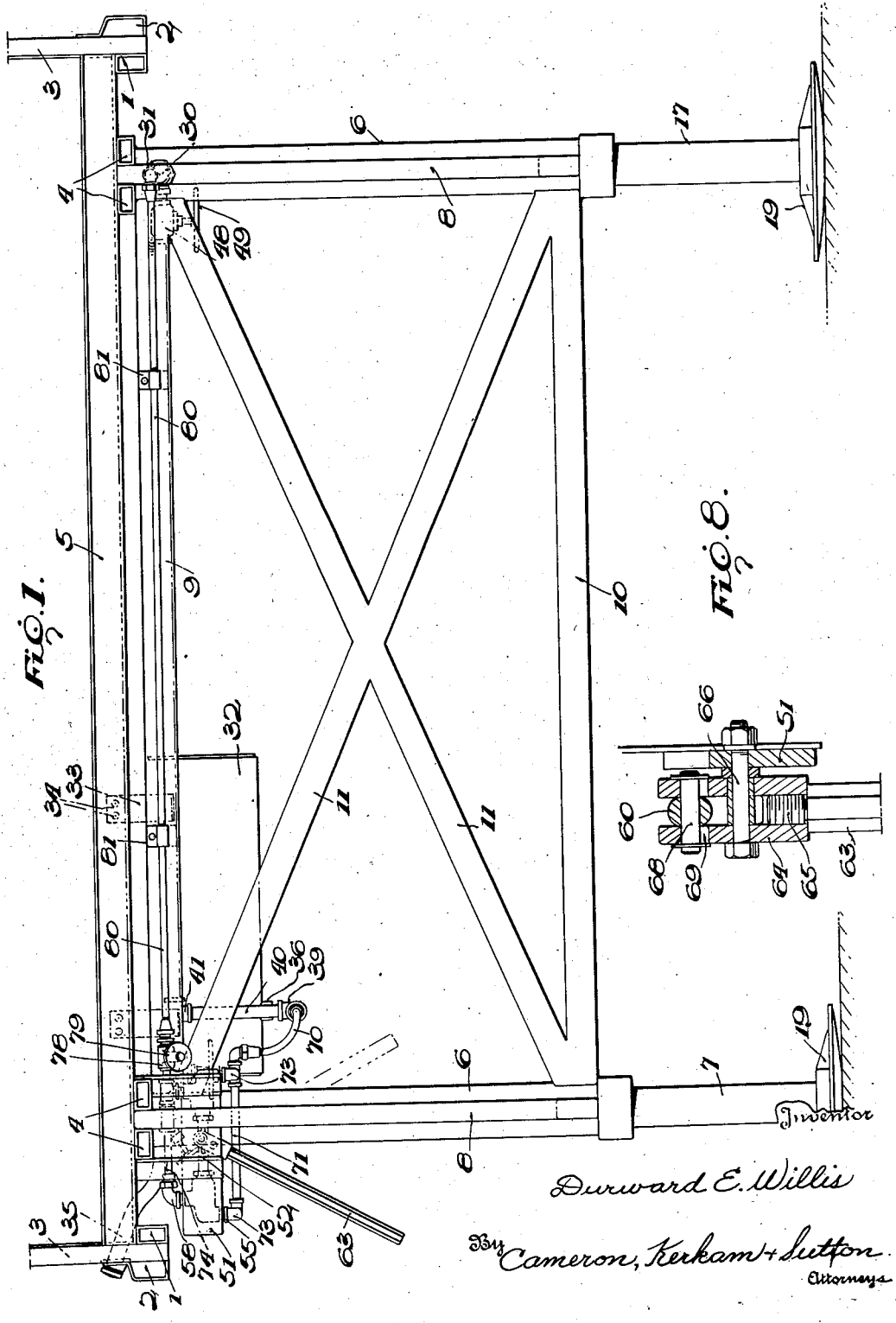
Inventor
Durward E. Willis
By Cameron, Kerkam + Sutton
Attorneys

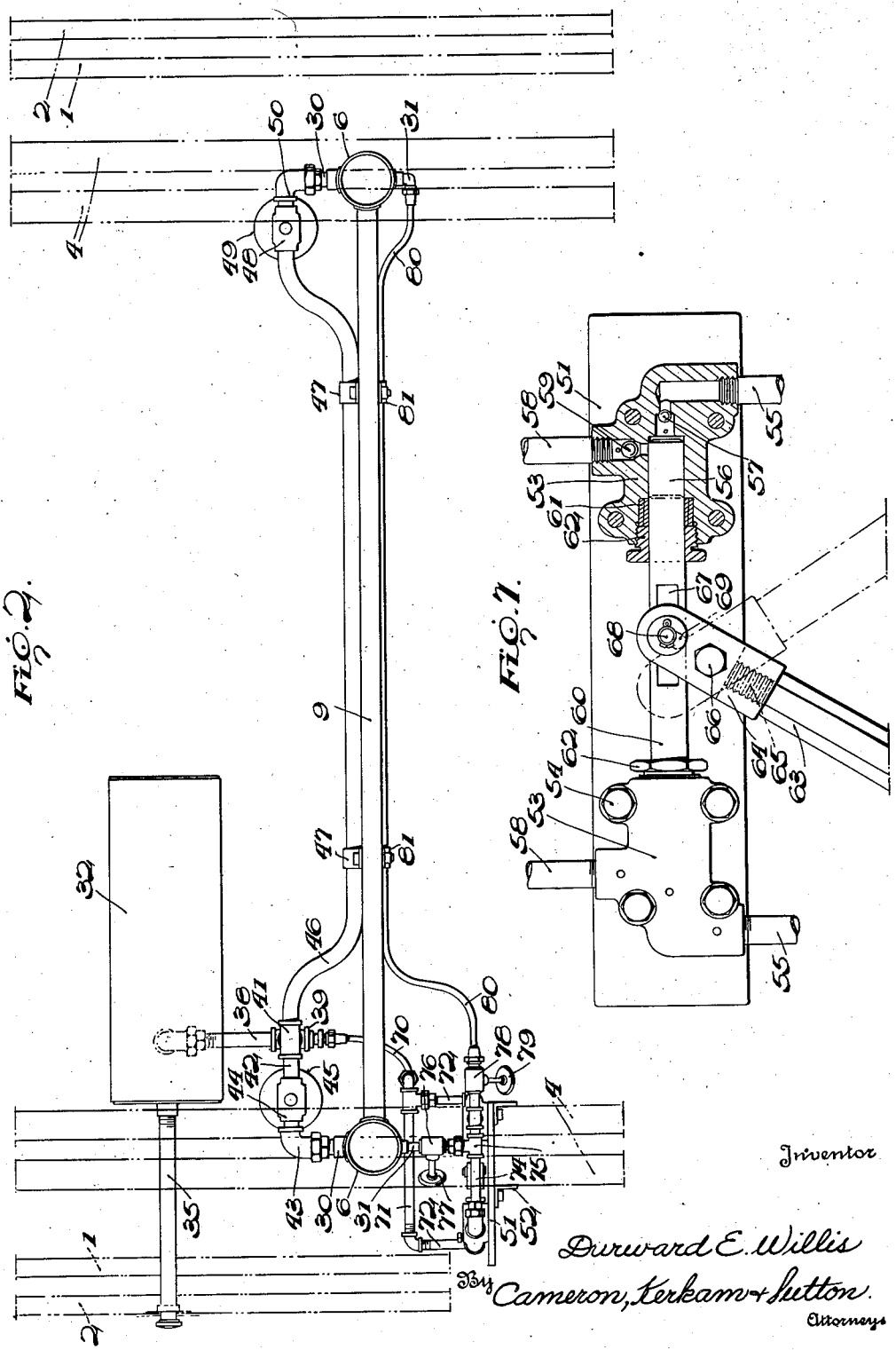

Aug. 7, 1945.　　　D. E. WILLIS　　　2,381,529
VEHICLE LANDING GEAR
Filed Nov. 16, 1944　　　3 Sheets-Sheet 3
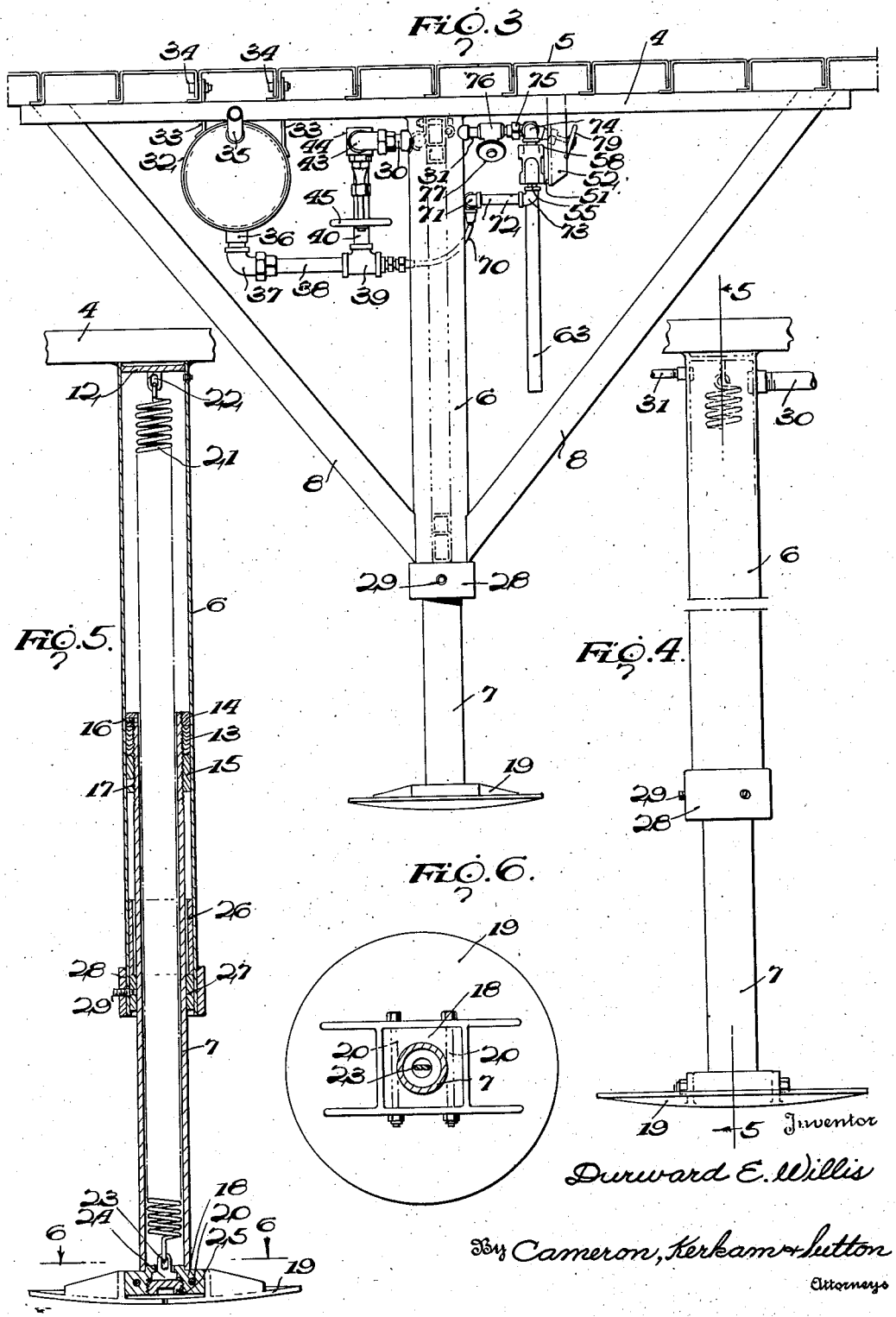

Patented Aug. 7, 1945

2,381,529

UNITED STATES PATENT OFFICE 2,381,529

VEHICLE LANDING GEAR

Durward E. Willis, Tampa, Fla.

Application November 16, 1944, Serial No. 563,766

5 Claims. (Cl. 254—86)

This invention relates to a retractable landing gear for vehicles, and particularly to a hydraulically operated landing gear for use on trailers and like vehicles, although it will be understood that the invention is not restricted to this use.

One of the objects of the invention is to provide a novel landing gear that is strong and rugged in construction, simple and easy to operate, and relatively inexpensive to build, install and maintain.

Another object is to provide a hydraulic landing gear comprising retractable vehicle supporting elements near the opposite sides of the vehicle which can be operated either jointly or independently whereby in the latter case the elements can be projected unequal distances or unequal pressures can be maintained in the cylinders.

One embodiment of the invention has been illustrated in the accompanying drawings but it is to be expressly understood that said drawings are for purposes of illustration only and are not to be taken as a definition of the limits of the invention, reference being had to the appended claims for this purpose.

In the drawings,

Fig. 1 is an end view of apparatus embodying the invention;

Fig. 2 is a plan view of the apparatus, parts of the vehicle body being removed;

Fig. 3 is a side view of the apparatus;

Fig. 4 is a detail showing a supporting element comprising a hydraulic cylinder and ram;

Fig. 5 is a section on the line 5—5 of Fig. 4;

Fig. 6 is a section on the line 6—6 of Fig. 5;

Fig. 7 is a view partly in section showing a pump used with the apparatus; and

Fig. 8 is a detail of part of the pump.

For purposes of illustration, the drawings show part of a trailer construction to which the landing gear is attached, but it will be understood that this construction is not part of the present invention and that the landing gear can be used with any other suitable type of vehicle body. This trailer construction comprises outer longitudinal frame members 1, rub rails 2, and associated side structure 3, and two pairs of additional longitudinal frame members 4, one pair near each side of the trailer body. As shown these longitudinal frame members are in the form of tubes of flattened cross section. The flooring of the trailer comprises inverted trough-shaped members 5 which extend side by side transversely of the trailer body, being supported by the longitudinal frame members 1 and 4 and secured thereto in any suitable manner as by welding. The flat bottoms of the troughs form a continuous floor as shown in Fig. 3 and the vertical flanges of the troughs form transverse stiffening and supporting means for the floor.

Depending from the trailer frame are two vertical hydraulic cylinders 6, each of which has a ram 7 capable of being extended into engagement with the ground to hold the trailer body in elevated position. The lower ends of the cylinders are spaced above the ground a suitable distance so that when the rams are retracted, the necessary clearance over the road surface will be provided. As shown by Fig. 1, one of these cylinders is located near each side of the vehicle, thereby providing widely spaced points of support for the body. The cylinders 6 are rigidly connected with and braced to the trailer frame so as to be capable of withstanding shocks encountered in service, as when coupling the trailer to its tractor. Moreover the cylinders and rams are preferably designed so that on accidental dropping of the loaded trailer the cylinders act as columns capable of withstanding the shock of ground engagement and of supporting the body and its load.

The arrangement and details of the means used for attaching the cylinders 6 to the trailer body so as to accomplish these ends depend to some extent on the construction of the trailer frame and are susceptible of considerable variation, so that the form shown in the drawings is only illustrative. In this form, each cylinder is braced longitudinally by means of a pair of inclined braces 8, preferably flattened tubes, which are secured at their lower ends to the lower end of the cylinder as by welding and extend upwardly therefrom fore and aft to the frame, their upper ends extending between the longitudinal frame members 4 and being secured thereto as by welding. The cylinders 6 are also connected and braced transversely of the vehicle by means of upper and lower horizontal tubes 9 and 10, respectively, the ends of which are secured as by welding to the cylinders, and by transverse diagonal braces 11 extending from the top of each cylinder to the bottom of the other cylinder, these braces being secured together at their intersection. Thus the two cylinders are connected integrally in a strong rigid subframe designed to withstand shocks encountered in service and also to support the vehicle in case of accidental dropping as mentioned above.

The details of a suitable cylinder and ram construction are shown by Figs. 4, 5 and 6. Each cylinder 6 comprises a hollow tubular shell which is closed at its top end by a plug 12 and which is secured as by welding to one pair of longitudinal frame members 4. Each ram 7 also comprises a hollow tubular member telescoping within its cylinder 6, the sliding joint at the top of each ram being sealed by packing of any suitable type. As shown, packing 13 is placed between the outer surface of the ram 7 and the inner surface of the cylinder 6, this packing being interposed between two collars 14 and 15 which are threaded on the end of the ram and held in place by set screws 16 and 17.

The lower end of each ram is closed by a head 18 which carries suitable ground engaging means here shown as a curved pad 19. Preferably the pad is detachably mounted on the head 18 by horizontal bolts 20 so that it can be removed for repair or replacement and so that other types of ground engaging means such as the usual small wheel can be substituted if desired. The head 18 can be attached to the ram 7 in any suitable manner as by means of a collar which fits within the end of the tubular ram, the latter being then welded to the head.

Preferably resilient means are provided for the purpose of automatically retracting the ram as described hereinafter. In the form shown a coil spring 21 is connected at its upper end to an eye 22 formed on the plug 12, and at its lower end to an eye 23 formed on a member 24 engaged in a recess in the head 18 and held in place by a nut 25.

The maximum extension of the ram is limited by a sleeve 26 inserted in the lower end of the cylinder 6 and adapted to be engaged by the collar 15. A bearing 27 in the lower end of the cylinder guides the sliding movement of the ram 7, this bearing being held in place by an outer collar 28 welded on the end of the cylinder and one or more set screws 29 threaded in the collar 28 and extending through openings in the cylinder 6 into engagement with the bearing 27.

With this construction, each ram can be pulled out individually by hand or foot to any extent necessary to bring its pad 19 into engagement with the ground, provided that a suction line 30 at the top of the cylinder is open. Thus inequalities or unevennesses of the ground surface at opposite sides of the vehicle can be accommodated, while at the same time two widely spaced points of support are provided. Also the suction created by outward movement of the rams keeps the cylinders always full of operating liquid withdrawn from a suitable reservoir through the pipes 30, and although the springs 21 are tensioned by such outward movement, the rams can be locked in their outward positions simply by closing the suction lines. Thereupon pressure in feed lines 31 at the tops of the cylinders, which is generated by means of a suitable pump, causes the rams to be further extended thus lifting and supporting the vehicle and its load.

A tank 32 for operating liquid is supported from the frame of the vehicle in any suitable manner as by means of straps 33 welded to the tank and bolted at 34 to the vertical flanges of the floor members 5. A filling tube 35 extends from the top of the tank out to one side of the vehicle above the rub rail 2. A suction connection 36 to the bottom of the tank is coupled by an elbow 37 to a horizontal pipe 38 and a T-connection 39 from which a vertical pipe 40 rises to approximately the level of the horizontal brace 9 and terminates in a T-connection 41. A suction line 42 leads from the T-connection 41 to an elbow 43 to which the suction pipe 30 of the adjacent cylinder 6 is connected, the suction line 42 being controlled by a suitable valve 44 and hand wheel 45. From the other end of the T-connection 41, a suction pipe 46 extends transversely of the vehicle, being secured throughout most of its length to the brace 9 by means of brackets 47. At the other side of the vehicle the pipe 46 connects to a valve casing 48 having an operating hand wheel 49, the valve casing being connected through an elbow 50 with the suction pipe 30 of the adjacent cylinder 6. It will accordingly be seen that the operation of the two rams 7 is independent one from the other, since the suction connections to the cylinders 6 can be opened or closed individually.

The supply of operating liquid under pressure to the feed pipes 31 of the cylinders 6 is preferably accomplished by a single pump with individual valve controls for the cylinders. A suitable type of pump for this purpose is shown in Figs. 7 and 8, although it will be understood that any other suitable pump can be employed instead. In the form shown, a supporting plate 51 is carried by brackets 52 which are secured to the longitudinal frame members 4. Two similar pump casings 53 are mounted on the connecting plate 51 by means of bolts 54, each of these casings having a bottom suction connection 55 leading to its pump chamber 56 and controlled by a ball check valve 57 and also an upper discharge connection 58 controlled by a ball check valve 59. A single piston rod 60 reciprocates at opposite ends in the two pump chambers 56 so that movement of the rod in either direction provides a suction stroke in one pump casing and a discharge stroke in the other pump casing. Suitable packing 61 and gland nuts 62 seal the pump chambers 56.

Preferably the piston rod 60 is adapted to be operated manually by means of a detachable handle 63. As shown in Figs. 7 and 8, an operating member 64 is provided with a threaded recess to receive the end 65 of the handle 63 and is rotatably mounted on the plate 51 by means of a bolt 66. The operating member 64 is forked at its upper end to straddle the piston rod 60 which is preferably flattened between the forks of the operating member as indicated at 67. A pin 68 extends through the piston rod and through slots 69 in the forks of the operating member so that the piston rod will be reciprocated on oscillatory movement of the handle 63.

The suction connections 55 of the pump are connected to the tank 32 in any suitable manner. As shown, the T-connection 39 is coupled by a pipe 70 with a pipe 71 having branches 72 each of which terminates in an elbow 73 connected to one of the suction pipes 55. The discharge pipes 58 of the pump are connected to a common pressure line 74 by which pressure liquid is delivered to the cylinders 6 through suitable individual pressure lines and valve controls. For example, a T-connection 75 in the pressure line 74 may be connected to a control valve casing 76 having an operating handle 77, the casing 76 being also connected to the pressure feed pipe 31 of the adjacent cylinder 6. The end of the pressure line 74 is connected to a similar control valve casing 78 having an operating handle 79 and a pressure supply line 80 leads from the valve 78 to the pressure feed pipe 31 of the opposite cylinder 6, the line 80 being supported on the horizontal brace 9 by means of brackets 81.

The operation of the system will be apparent from the foregoing description, but may be summarized as follows. When it is desired to uncouple the trailer from its tractor, the operator opens one of the suction valves 44 or 48 and pulls the pad 19 down into engagement with the ground, thereafter locking the ram in extended position by closing the suction valve. This operation is then repeated with the opposite pad 19. It will be observed that these operations are independent and that the amount of extension of each ram can be adjusted individually to suit the condition of the road surface or ground on which the trailer is to be supported, which may vary considerably especially with widely spaced rams. Thereupon the operator as a rule opens both of the feed valves 76 and 78, inserts the handle 63 in the operating member 64, and operates the pump to pump out both rams simultaneously until the trailer has been elevated sufficiently to uncouple the tractor. Under this condition equal pressures are maintained in both cylinders, since both are connected to a common pressure line on the discharge side of the pump, and assuming substantially even load on the two sides of the vehicle, the vehicle body will be lifted without tilting, although the actual amount of extension of the two rams may be different. When pumping has been completed, the feed valves 76 and 78 are closed, thereby locking both rams in extended position. Thereafter it makes no difference whether the body of the trailer is unloaded from one side before the other since no movement of either ram can take place and they are in effect rigid supports at the opposite sides of the trailer body. When it is desired to lower the trailer body, as for example when the tractor has been moved into coupling position, the suction valves 44 and 48 may be first cracked to permit the body to descend gently until it is supported by the tractor, after which the valves are fully opened and the springs 21 automatically retract the pads 19 to their inactive positions.

Under some conditions the trailer body may be loaded unevenly so that the weight is different on the opposite sides of the vehicle. Under the conditions described above, this uneven weight distribution would result in elevating one side of the vehicle before the other, since less pressure would be required to operate the ram on the side having the lighter load. As a rule such tilting of the vehicle body is not desirable. On the other hand, occasions may arise when it is desired to tilt the vehicle body deliberately, regardless of load distribution. In such cases the feed control valves 76 anad 78 can be used to provide and maintain unequal pressures in the two cylinders. For example, suppose that there is a greater load on the right-hand side of the vehicle as shown in Fig. 1 so that a greater pressure is required to operate the right-hand ram than to operate the left-hand ram. In this case the valve 76 may be closed and the valve 78 opened and the necessary pressure produced in the right-hand cylinder 6 without affecting the left-hand cylinder. Thereupon the valves 76 and 78 may be reversed and the left-hand cylinder 6 operated with appropriate pressure. By suitable manipulation of the valves, the operator can thus lift the body without substantial tilting, regardless of uneven load distribution, or he can lift one side above the other to obtain tilting in case that is desirable.

These results are secured by apparatus which is strong and rugged in construction so that there is little likelihood of damage in service, which is simple and easy to operate, and which is light in weight and relatively inexpensive to build, install and maintain.

While only one embodiment of the invention has been described and illustrated in the drawings, it will be understood that the invention is not restricted to this embodiment and that various changes can be made in the form, details of construction, and arrangement of the parts without departing from the spirit of the invention. Reference should therefore be had to the appended claims for a definition of the limits of the invention.

What is claimed is:

1. Hydraulic landing gear apparatus for vehicles which comprises a pair of hydraulic cylinders depending substantially vertically from and rigidly attached to the vehicle body one near each side thereof, each of said cylinders terminating a substantial distance above the ground and having individually extensible rams carrying ground engaging means, a reservoir for operating fluid, suction lines from said reservoir to each of said cylinders, a valve for the suction line of each cylinder whereby each ram can be moved independently between retracted and ground-engaging positions, pump means having a suction connection to said reservoir, and pressure lines connecting said pump means to each cylinder whereby the rams can be pumped further out of the cylinders after the suction line valves are closed.

2. Hydraulic landing gear apparatus for vehicles which comprises a pair of hydraulic cylinders depending substantially vertically from and rigidly attached to the vehicle body one near each side thereof, each of said cylinders terminating a substantial distance above the ground and having individually extensible rams carrying ground engaging means, a reservoir for operating fluid, suction lines from said reservoir to each of said cylinders, a valve for the suction line of each cylinder whereby each ram can be moved independently between retracted and ground-engaging positions, pump means having a suction connection to said reservoir, and pressure lines connecting said pump means to each cylinder whereby the rams can be pumped further out of the cylinders after the suction line valves are closed, said ground-engaging means being detachably mounted on said rams for removal and replacement.

3. Hydraulic landing gear apparatus for vehicles which comprises a pair of hydraulic cylinders depending substantially vertically from and rigidly attached to the vehicle body one near each side thereof, each of said cylinders terminating a substantial distance above the ground and having individually extensible rams carrying ground engaging means, a reservoir for operating fluid, suction lines from said reservoir to each of said cylinders, a valve for the suction line of each cylinder whereby each ram can be moved independently between retracted and ground-engaging positions, pump means having a suction connection to said reservoir, and pressure lines connecting said pump means to each cylinder whereby the rams can be pumped further out of the cylinders after the suction line valves are closed, each cylinder having resilient means tensioned by extension of its ram for retracting the same when the suction line valve is opened.

4. Hydraulic landing gear apparatus for vehicles which comprises a pair of hydraulic cylinders depending substantially vertically from and rigidly attached to the vehicle body one near each side thereof, each of said cylinders terminating a substantial distance above the ground and having individually extensible rams carrying ground engaging means, a reservoir for operating fluid, suction lines from said reservoir to each of said cylinders, a valve for the suction line of each cylinder whereby each ram can be moved independently between retracted and ground-engaging positions, pump means having a suction connection to said reservoir, pressure lines connecting said pump means to each cylinder whereby the rams can be pumped further out of the cylinders after the suction line valves are closed, and a valve for each pressure line whereby each ram can be pumped out individually from its cylinder.

5. Hydraulic landing gear apparatus for vehicles which comprises a pair of hydraulic cylinders depending substantially vertically from and rigidly attached to the vehicle body one near each side thereof, each of said cylinders terminating a substantial distance above the ground and having individually extensible rams carrying ground engaging means, a reservoir for operating fluid, suction lines from said reservoir to each of said cylinders, a valve for the suction line of each cylinder whereby each ram can be moved independently between retracted and ground-engaging positions, pump means having a suction connection to said reservoir, pressure lines connecting said pump means to each cylinder whereby the rams can be pumped further out of the cylinders after the suction line valves are closed, and a valve for each pressure line whereby each ram can be pumped out individually from its cylinder, each of said cylinders housing resilient means tensioned by extension of its ram for retracting the same when the corresponding suction line valve is opened.

DURWARD E. WILLIS.